(12) United States Patent
Liu (10) Patent No.: US 11,475,708 B2
(45) Date of Patent: Oct. 18, 2022

(54) FACE FEATURE POINT DETECTION METHOD AND DEVICE, EQUIPMENT AND STORAGE MEDIUM

(71) Applicant: ZHEJIANG UNIVIEW TECHNOLOGIES CO., LTD., Zhejiang (CN)

(72) Inventor: Dawei Liu, Zhejiang (CN)

(73) Assignee: ZHEJIANG UNIVIEW TECHNOLOGIES CO., LTD., Zhejiang (CN)

(*) Notice: Subject to any disclaimer, the term of this patent is extended or adjusted under 35 U.S.C. 154(b) by 0 days.

(21) Appl. No.: 17/266,958

(22) PCT Filed: Feb. 22, 2019

(86) PCT No.: PCT/CN2019/075801
§ 371 (c)(1),
(2) Date: Feb. 8, 2021

(87) PCT Pub. No.: WO2020/029572
PCT Pub. Date: Feb. 13, 2020

(65) Prior Publication Data
US 2021/0303827 A1    Sep. 30, 2021

(30) Foreign Application Priority Data
Aug. 10, 2018 (CN) .......................... 201810909381.3

(51) Int. Cl.
*G06K 9/00* (2022.01)
*G06V 40/16* (2022.01)
*G06V 10/48* (2022.01)
(52) U.S. Cl.
CPC ............ *G06V 40/171* (2022.01); *G06V 10/48* (2022.01); *G06V 40/165* (2022.01)

(58) Field of Classification Search
CPC .. G06V 40/168; G06V 40/172; G06V 40/161; G06V 40/171; G06V 40/165;
(Continued)

(56) References Cited

U.S. PATENT DOCUMENTS

2017/0039419 A1* 2/2017 Shiiyama ............... G06V 40/50
2017/0193284 A1* 7/2017 Yoon .................... G06V 40/169
2018/0253622 A1* 9/2018 Chen ...................... G06V 10/82

FOREIGN PATENT DOCUMENTS

CN       101337128 A       1/2009
CN       101350063 A       1/2009
(Continued)

OTHER PUBLICATIONS

International Search Report issued from the International Search Authority to International Application No. PCT/CN2019/075801 dated May 28, 2019, 4 pages.
(Continued)

*Primary Examiner* — Quan M Hua
(74) *Attorney, Agent, or Firm* — Hunton Andrews Kurth LLP (57) ABSTRACT

Provided are a face feature point detection method, applied to an image processing device, where the image processing device stores a feature area detection model and a feature point detection model. The method includes: preprocessing a face image to be detected to obtain a preprocessed target face image; performing feature point extraction on the target face image according to the feature area detection model and the feature point detection model to obtain a target feature point coordinate located within a face feature area in the target face image; and performing coordinate transformation on the target feature point coordinate to obtain a face feature point coordinate corresponding to the face image to be
(Continued)

detected. Further provided are a face feature point detection device, an equipment and a storage medium.

19 Claims, 4 Drawing Sheets

(58) Field of Classification Search
CPC .... G06V 10/255; G06V 20/64; G06V 40/176; G06V 40/16; G06V 10/993; G06V 40/175; G06V 40/193; G06V 10/267; G06V 10/44; G06V 10/446; G06V 10/449; G06V 10/7557; G06V 40/174; G06V 40/18; G06V 40/19; G06V 40/20; G06T 2207/30201; G06T 11/60; G06T 2207/10012; G06T 2207/20021; G06T 2207/20104; G06T 7/20; G06T 1/00; G06K 9/6247
See application file for complete search history.

(56) References Cited

FOREIGN PATENT DOCUMENTS

| CN | 102054291 A | 5/2011 |
|---|---|---|
| CN | 103632672 A | 3/2014 |
| CN | 105139007 | * 9/2015 |
| CN | 105426867 A | 3/2016 |
| CN | 105574518 A | 5/2016 |
| CN | 105868767 A | 8/2016 |
| CN | 106598221 A | 4/2017 |
| CN | 107122650 A | 9/2017 |
| CN | 107506693 A | 12/2017 |
| CN | 107506747 A | 12/2017 |
| CN | 107767335 A | 3/2018 |
| CN | 107948538 A | 4/2018 |
| CN | 108206941 A | 6/2018 |
| CN | 108229293 A | 6/2018 |
| CN | 108259782 A | 7/2018 |
| JP | 2007102601 A | 4/2007 |

OTHER PUBLICATIONS

Extended European Search Report, from the European Patent Office, issued to EP Application No. 19848008.9, Apr. 5, 2022, 10 pages.
Zhou, E., et al., Extensive Facial Landmark Localization with Coarse-to-fine Convolutional Network Cascade, (2013), IEEE International Conference on Computer Vision Workshops, pp. 386-391, 6 pages.
First Office Action, issued from The State Intellectual Property Office of People's Republic of China, to CN Application No. 201810909381.3 dated Dec. 22, 2021, 18 pages.

* cited by examiner

FACE FEATURE POINT DETECTION METHOD AND DEVICE, EQUIPMENT AND STORAGE MEDIUM

CROSS-REFERENCE TO RELATED APPLICATION

This is a National stage application, filed under 37 U.S.C. § 371, of International Patent Application No. PCT/CN2019/075801, filed on Feb. 22, 2019, which is based on and claims priority to Chinese patent application No. 201810909381.3 filed with the China National Intellectual Property Administration on Aug. 10, 2018, the disclosure of which is incorporated herein by reference in its entirety.

TECHNICAL FIELD

The present disclosure relates to the field of face feature point detection technologies, and for example, to a face feature point detection method and device, an equipment and a storage medium.

BACKGROUND

With the development of science and technology, the face feature point detection technologies have been gradually mature and are widely used in the fields such as artificial intelligence interaction, video conference, identity authentication and the like. The face feature point detection technologies can accurately position parts such as eyebrows, eyes, nose, mouth and the like in the face image by making use of information near the face feature parts and the positional relationship between multiple feature points. Therefore, how to ensure the accuracy of face feature point detection is an important problem for the face feature point detection technologies.

SUMMARY

The present disclosure provides a face feature point detection method and device, an equipment and a storage medium.

In an embodiment, the present disclosure provides a face feature point detection method, applied to an image processing device. The image processing device stores a feature area detection model for detecting a face feature area and a feature point detection model for detecting a face feature point, and the method includes the steps described below.

A face image to be detected is preprocessed to obtain a preprocessed target face image.

Feature point extraction is performed on the target face image according to the feature area detection model and the feature point detection model to obtain a target feature point coordinate located within the face feature area in the target face image.

Coordinate transformation is performed on the target feature point coordinate to obtain a face feature point coordinate corresponding to the face image to be detected.

In an embodiment, the present disclosure provides a face feature point detection device, applied to an image processing device. The image processing device stores a feature area detection model for detecting a face feature area and a feature point detection model for detecting a face feature point, and the device includes an image preprocessing module, a target feature acquisition module and a feature point coordinate transformation module.

The image preprocessing module is configured to preprocess a face image to be detected to obtain the preprocessed target face image.

The target feature acquisition module is configured to perform feature point extraction on the target face image according to the feature area detection model and the feature point detection model to obtain a target feature point coordinate face located within a face feature area of the target face image.

The feature point coordinate transformation module is configured to perform coordinate transformation on the target feature point coordinate to obtain face feature point coordinate corresponding to the face image to be detected.

In one embodiment, the present disclosure further provides an equipment. The equipment includes a memory and a processor, where the memory is configured to store a computer program, and when executed by the processor, the computer program implements the method of any embodiment described above.

In one embodiment, the present disclosure further provides a storage medium storing a computer-readable program. When the computer-readable program is configured to, when executed, implement the method of any embodiment described above is performed.

REFERENCE LIST

10 image processing device
11 a first memory
12 a first processor
13 communication unit
100 face feature point detection device
110 image preprocessing module
120 target feature acquisition module
130 feature point coordinate transformation module
121 feature point extraction sub-module
122 feature area extraction sub-module
123 feature point screening sub-module
125 target image acquisition sub-module
126 image feature acquisition sub-module
127 image feature transformation sub-module 810 a second processor
820 a second memory

DETAILED DESCRIPTION

The embodiments described herein are part, not all, of embodiments of the present disclosure. Generally, the components of embodiments of the present disclosure described and illustrated in the drawings herein may be arranged and designed through multiple configurations.

Similar reference numerals and letters indicate similar items in the following drawings, and therefore, once a particular item is defined in one drawing, the item needs no more definition and explanation in subsequent drawings.

Some embodiments of the present disclosure will be described hereinafter in conjunction with the drawings. If not in collision, the embodiments described herein and the features thereof may be combined with each other.

Figure 1:
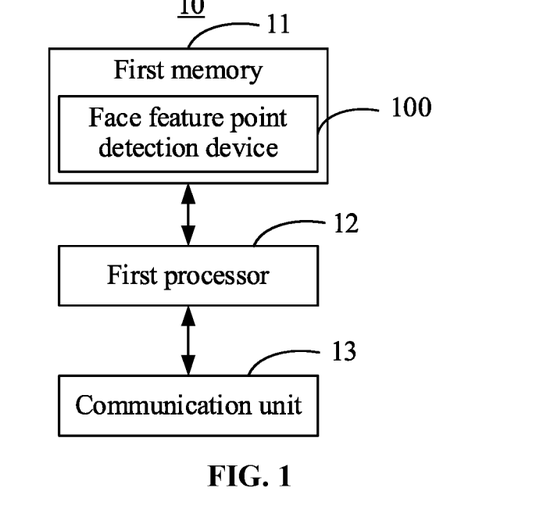
FIG. 1 is a schematic diagram of an image processing device according to an embodiment of the present disclosure.

With reference to FIG. 1, FIG. 1 is a schematic diagram of an image processing device 10 according to an embodiment of the present disclosure. In an embodiment of the present disclosure, the image processing device 10 is configured to perform a face feature point detection on a face image, and the image processing device 10 includes a face feature point detection device 100, a first memory 11, a first processor 12 and a communication unit 13. The first memory 11, the first processor 12 and the communication unit 13 are electrically connected to each other directly or indirectly to implement the transmission and interaction of data. For example, the electrical connections between these components may be implemented through one or more communication buses or signal lines. The face feature point detection device 100 includes at least one software function module capable of being stored in the first memory 11 in the form of software or firmware, and the first processor 12 performs one or more functional applications and data processing by executing the software function module corresponding to the face feature point detection device 100 stored in the first memory 11.

In this embodiment, the first memory 11 may be configured to store a feature area detection model and a feature point detection model, where the feature area detection model is used for detecting a face feature area in a face image and the feature point detection model is used for detecting a face feature point in the face image. In an embodiment, the face feature area may include at least one of: a left eyebrow area, a right eyebrow area, a left eye area, a right eye area, a nose area, and a mouth area. In an embodiment, the face feature points may include at least one of: two corners of each eyebrow, a center point of each eyebrow, two corners of each eye, a center point of an upper eyelid, a center point of a lower eyelid, a center point of each eye, a nose tip point, a nose peak point, two ala nasi points, a nasal septum point, two corners of a mouth, a center point of the mouth, an uppermost point of an upper lip and a lowermost point of a lower lip. The feature area detection model is able to detect all face feature areas actually existing in the face image. For the face feature areas (blocked or missing) that do not exist in the face image in a case where the face posture in the face image are abnormal, these nonexistent face feature areas cannot be detected through the feature area detection model. The feature point detection model is able to detect face feature points actually existing in the face image, but cannot directly ensure positions of the detected face feature points are correct.

In this embodiment, the feature area detection model is a detection model obtained by training by using a training sample of face image in which face feature areas are manually calibrated based on a convolutional neural network, and the feature point detection model is a detection model obtained by training by using a training sample of face image in which face feature points are manually calibrated based on the convolutional neural network. The feature area detection model and the feature point detection model may be obtained by performing training by the image processing device 10 itself, or may be acquired from an external device and stored in the first memory 11. The first memory 11 may be, but is not limited to, a random access memory, a read-only memory, a programmable read-only memory, an erasable programmable read-only memory, and an electrically erasable programmable read-only memory. The first memory 11 may be configured to store one or more application programs, and the first processor 12 executes the one or more application programs after receiving an execution instruction. In an embodiment, software programs and modules in the first memory 11 may further include an operation system, which may include one or more software components and/or drivers for managing system tasks (such as memory management, storage device control, power management and the like) and may communicate with one or more hardware or software components to provide a running environment for other software components.

In this embodiment, the first processor 12 may be an integrated circuit chip having a signal processing capability. The first processor 12 may be a general-purpose processor, including a central processing unit (CPU), a network processor (NP) and the like. The first processor 12 can implement or execute one or more methods, steps and logic block diagrams disclosed in the embodiments of the present disclosure. The general-purpose processor may be a microprocessor or any conventional processor.

In this embodiment, the communication unit 13 is configured to establish a communication connection between the image processing device 10 and other external devices via a network, and to perform data transmission via the network.

In this embodiment, the image processing device 10 ensures that the image processing device 10 can accurately position feature points of a face having a normal posture as well as feature points of a face having an abnormal posture by the face feature point detection device 100 stored in the first memory 11, thereby ensuring the detection effect of the face feature points.

In an embodiment, the structure shown in FIG. 1 is only one structure diagram of the image processing device 10. The image processing device 10 may further include more or less components than the components shown in FIG. 1, or have a configuration different from the configuration shown in FIG. 1. Various components shown in FIG. 1 may be implemented by hardware, software or a combination thereof.

Figure 2:
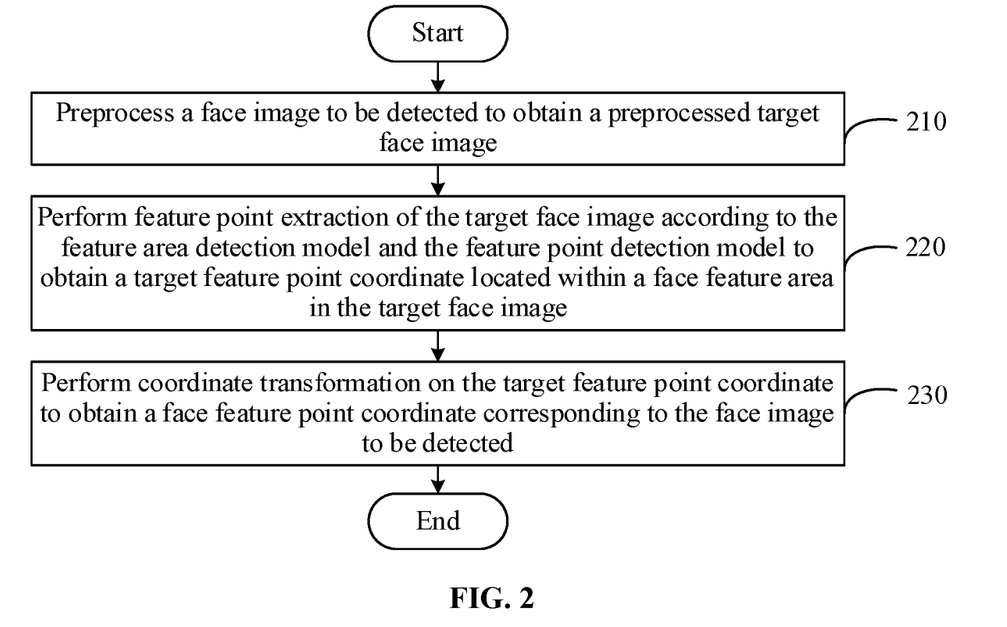
FIG. 2 is a flowchart of a face feature point detection method according to an embodiment of the present disclosure.

With reference to FIG. 2, FIG. 2 is a flowchart of a face feature point detection method according to an embodiment of the present disclosure. In the embodiment of the present disclosure, the face feature point detection method 100 is applied to the above image processing device 10, where the image processing device 10 stores a feature area detection model for detecting a face feature area and a feature point detection model for detecting a face feature point. In one embodiment, the face feature point detection method includes steps 210 to 230.

In step 210, a face image to be detected is preprocessed to obtain a preprocessed target face image.

In this embodiment, when the image processing device 10 obtains a face image to be detected, the image processing device 10 can perform size reduction, size enlargement or other preprocessing on the face image to be detected to adjust the size of the face image to be detected to a size matched with the feature area detection model and the feature point detection model, thereby obtaining a target face image corresponding to the face image to be detected. In this case, there is a mapping relationship between the face image to be detected and the target face image.

In step 220, feature point extraction of the target face image is performed according to the feature area detection model and the feature point detection model to obtain a target feature point coordinate located within the face feature area in the target face image.

In this embodiment, the image processing device 10 may acquire, in the target face image, a relevant coordinate of the target feature point located within the face feature area actually existing in the target face image through the feature area detection model and the feature point detection model so as to obtain a coordinate of the corresponding face feature point on the face image to be detected through all the target feature point coordinates in the target face image.

Figure 3:
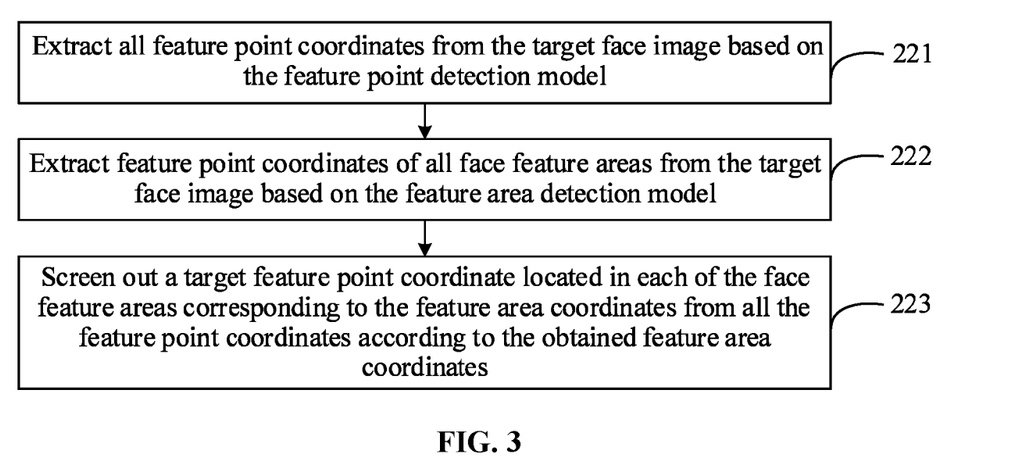
FIG. 3 is a flowchart of another face feature point detection method according to an embodiment of the present disclosure.

In an embodiment, with reference to FIG. 3, FIG. 3 is a flowchart of another face feature point detection method according to an embodiment of the present disclosure, and is also one of flowcharts of sub-steps included in the step 220 shown in FIG. 2. In an implementation of this embodiment, the step 220 may include sub-steps 221, 222 and 223.

In the sub-step 221, all feature point coordinates are extracted from the target face image based on the feature point detection model.

In this embodiment, the image processing device 10 may extract all feature point coordinates existing in the target face image from the target face image through the feature point detection model.

In the sub-step 222, feature point coordinates of all the face feature areas are extracted from the target face image based on the feature area detection model.

In this embodiment, the image processing device 10 may extract all face feature areas existing in the target face image from the target face image and the feature area coordinate corresponding to each face feature area through the feature area detection model.

In the sub-step 223, a target feature point coordinate located in the face feature area corresponding to each feature area coordinate is screened out from all feature point coordinates according to the obtained feature area coordinates.

In this embodiment, the image processing device 10 performs coordinate screening on all the acquired feature point coordinates through the acquired feature area coordinates of all face feature areas to obtain the target feature point coordinate located within each face feature area in the target face image.

In an embodiment, the step in which the target feature point coordinate located in the face feature area corresponding to each feature area coordinate is screened out from all feature point coordinates according to the obtained feature area coordinates includes the steps described below.

Each of the feature point coordinates is compared with a feature area coordinate corresponding to each of the face feature areas.

If one or more feature point coordinates are located in the face feature areas, the one or more feature point coordinates are used as the one or more target feature point coordinates in the target face image.

Figure 4:
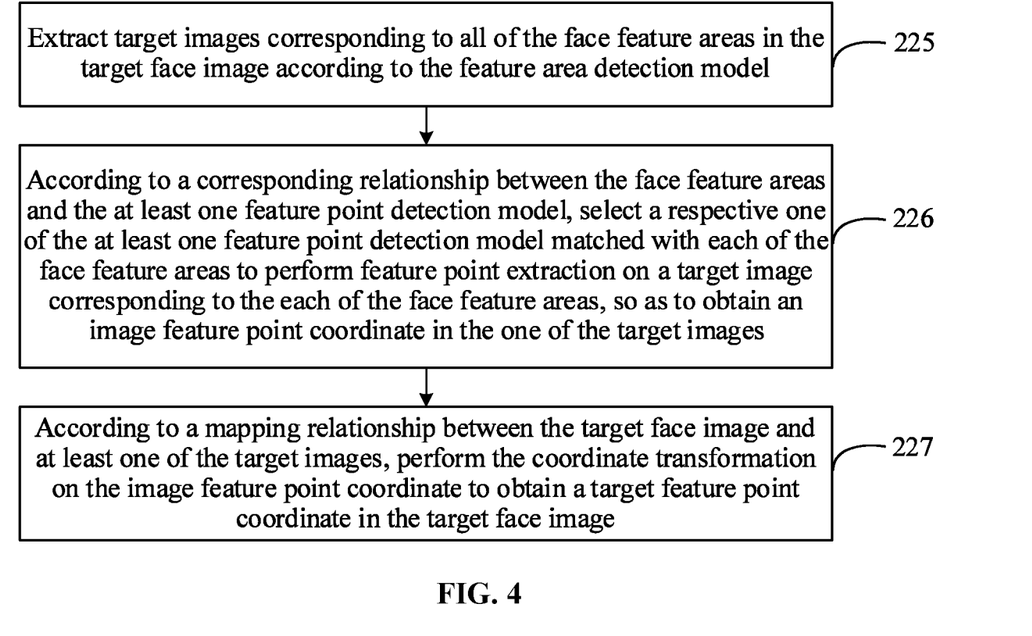
FIG. 4 is a flowchart of another face feature point detection method according to an embodiment of the present disclosure.

With reference to FIG. 4, FIG. 4 is a flowchart of another face feature point detection method according to an embodiment of the present disclosure, and is also one of flowcharts of sub-steps included in the step 220 shown in FIG. 2. In another implementation of this embodiment, at least one feature point detection model is provided, and each of the at least one feature point detection model corresponds to one face feature area extracted by the feature area detection model. For example, when the feature area detection model is able to extract 6 face feature areas from one face image having a normal face posture, each face feature area corresponds to one feature point detection model, and the feature point detection model corresponding to each face feature area is only used for detecting a feature point existing on part of the face image, the part of the face image corresponding to each face feature area. In this case, the step 220 may include sub-steps 225, 226 and 227.

In the sub-step 225, target images corresponding to all face feature areas in the target face image are extracted from the target face image according to the feature area detection model.

In this embodiment, the image processing device 10 extracts feature area coordinates of all face feature areas existing in the target face image through the feature area detection model, and segments a target image corresponding to one or more face feature areas from the target face image based on one or more feature area coordinates.

In the sub-step 226, according to a corresponding relationship between the face feature areas and the at least one feature point detection model, a respective one of the at least one feature point detection model matched with each of the face feature areas is selected, and feature point extraction is performed on a target image corresponding to each of the face feature areas, so as to obtain an image feature point coordinate in each of the target images.

In this embodiment, according to the corresponding relationship between the face feature areas and the feature point detection models, the image processing device 10 selects a respective feature point detection model corresponding to each of one or more face feature areas in the target face image and performs feature point extraction on a target image corresponding to the each of the one or more face feature areas, so as to obtain an image feature point coordinate in each target image. For example, if the face feature areas existing in one target face image are feature area A, feature area B and feature area C respectively, target images corresponding to the three face feature areas in the target face image are image A1, image B1 and image C1 respectively, where the feature point detection model corresponding to the feature area A is model 1, the feature point detection model corresponding to the feature area B is model 2, and the feature point detection model corresponding to the feature area C is model 3. In this case, the image processing device 10 adjusts a size of the image A1 to a size matched with the model 1 and performs feature point extraction on the adjusted image A1 by the model 1 to obtain an image feature point coordinate in the adjusted image A1; adjusts a size of the image B1 to a size matched with the model 2 and performs feature point extraction on the adjusted image B1 by the model 2 to obtain an image feature point coordinate in the adjusted image B1; and adjusts a size of the image C1 to a size matched with the model 3 and performs feature point extraction on the adjusted image C1 by the model 3 to obtain an image feature point coordinate in the adjusted image C1.

In step 227, according to a mapping relationship between the target face image and at least one target images, coordinate transformation is performed on each image feature point coordinate to obtain a target feature point coordinate in the target face image.

In this embodiment, in a case where the image processing device 10 segments at least one target image from the target face image, a position mapping relationship corresponding to the at least one target images in the target face image can be obtained. After obtaining the image feature point coordinate in each target image, the image processing device 10 performs, according to a mapping relationship between the target face image and the at least one target images, the coordinate transformation on the image feature point coordinate of each image feature point coordinate to obtain a target feature point coordinate in the target face image.

With reference to FIG. 2, in the step 230, the coordinate transformation is performed on the target feature point coordinate to obtain the face feature point coordinate corresponding to the face image to be detected.

In this embodiment, the step in which the coordinate transformation is performed on the obtained target feature point coordinate to obtain the face feature point coordinate corresponding to the face image to be detected includes the following.

According to a mapping relationship between the face image to be detected and the target face image, the coordinate transformation is performed on each target feature point coordinate in the target face image to obtain a corresponding face feature point coordinate.

In this embodiment, the image processing device 10 defines the distribution of effective feature points in the face image to be detected through the feature area detection model. That is, the effective feature points should be located within the corresponding face feature area, and the face feature point coordinate located within the face feature area is obtained through the feature point detection model, thereby ensuring the detection effect of the face feature point through the effective face feature point coordinate located within the face feature area. The face feature point detection method can not only accurately position feature points of the face having a normal posture, but also accurately position feature points of the face having an abnormal posture.

Figure 5:
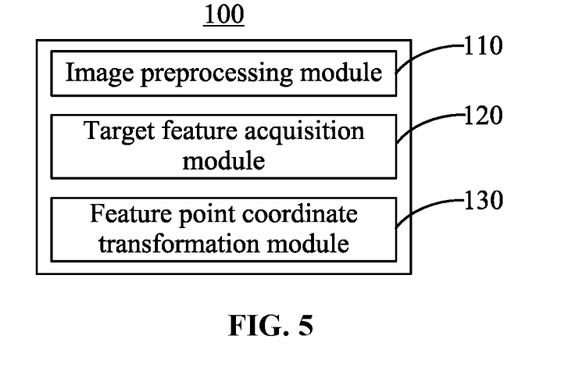
FIG. 5 is a structure diagram of a face feature point detection device according to an embodiment of the present disclosure.

With reference to FIG. 5, FIG. 5 is a structure diagram of a face feature point detection device 100 according to an embodiment of the present disclosure. In the embodiment of the present disclosure, the face feature point detection device 100 is applied to the above image processing device 10, where the image processing device 10 stores a feature area detection model for detecting a face feature area and a feature point detection model for detecting a face feature point. The face feature point detection device 100 includes an image preprocessing module 110, a target feature acquisition module 120 and a feature point coordinate transformation module 130.

The image preprocessing module 110 is configured to preprocess a face image to be detected to obtain the preprocessed target face image.

In this embodiment, the image preprocessing module 110 may perform the step 210 shown in FIG. 2, and the execution process may refer to the description of the step 210.

The target feature acquisition module 120 is configured to perform feature point extraction on the target face image according to the feature area detection model and the feature point detection model to obtain a target feature point coordinate located within the face feature area in the target face image.

Figure 6:
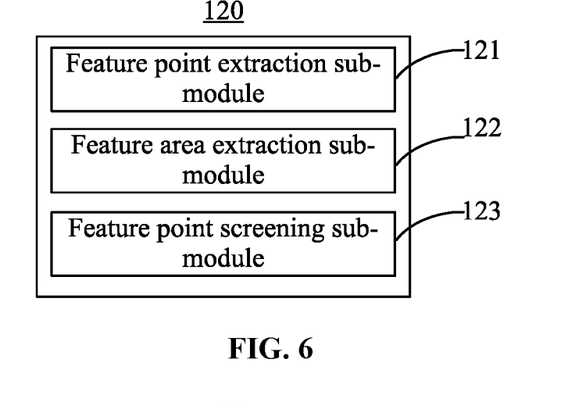
FIG. 6 is a structure diagram of a target feature acquisition module according to an embodiment of the present disclosure.

In an embodiment, with reference to FIG. 6, FIG. 6 is a structure diagram of a target feature acquisition module according to an embodiment of the present disclosure, and is also one of structure diagrams of the target feature acquisition module 120 shown in FIG. 5. In an implementation of this embodiment, the target feature acquisition module 120 includes a feature point extraction sub-module 121, a feature area extraction sub-module 122, and a feature point screening sub-module 123.

The feature point extraction sub-module 121 is configured to extract all feature point coordinates from the target face image based on the feature point detection model.

The feature area extraction sub-module 122 is configured to extract feature area coordinates of all face feature areas from the target face image based on the feature area detection model.

The feature point screening sub-module 123 is configured to screen out, according to the obtained feature area coordinates, a target feature point coordinate located in the face feature areas corresponding to the feature area coordinates from all feature point coordinates.

In this embodiment, the feature point extraction sub-module 121, the feature area extraction sub-module 122, and the feature point screening sub-module 123 may perform sub-steps 221, 222 and 223 shown in FIG. 3 respectively, and the execution process may refer to the description of the sub-steps 221, 222 and 223.

Figure 7:
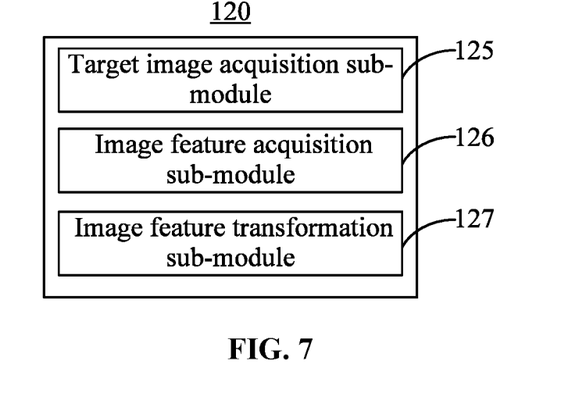
FIG. 7 is a structure diagram of another target feature acquisition module according to an embodiment of the present disclosure.

With reference to FIG. 7, FIG. 7 is a structure diagram of another target feature acquisition module according to an embodiment of the present disclosure, and is also one of block diagrams of the target feature acquisition module 120 shown in FIG. 5. In an embodiment of the present embodiment, at least one feature point detection model is provided, and each feature point detection model corresponds to one face feature area extracted by the feature area detection model. The target feature acquisition module 120 includes a target image acquisition sub-module 125, an image feature acquisition sub-module 126, and an image feature transformation sub-module 127.

The target image acquisition sub-module 125 is configured to extract all target images corresponding to all face feature areas in the target face image according to the feature area detection model.

The image feature acquisition sub-module 126 is configured to, according to a corresponding relationship between the face feature areas and the at least one feature point detection model, select a respective one of the at least one feature point detection model matched with each of the face feature areas and perform feature point extraction on a target image corresponding to each of the face feature areas, so as to obtain an image feature point coordinate in each of the target images.

The image feature transformation sub-module 127 is configured to, according to a mapping relationship between the target face image and at least one of the target images, perform coordinate transformation on the image feature point coordinate to obtain a target feature point coordinate in the target face image.

In this embodiment, the target image acquisition sub-module 125, the image feature acquisition sub-module 126, and the image feature transformation sub-module 127 may perform sub-steps 225, 226 and 227 shown in FIG. 4 respectively, and the execution process may refer to the description of the sub-steps 225, 226 and 227.

With continued reference to FIG. 5, the feature point coordinate transformation module 130 is configured to perform the coordinate transformation on the obtained target feature point coordinate to obtain a face feature point coordinate corresponding to the face image to be detected.

In this embodiment, the feature point coordinate transformation module 130 may perform the step 230 shown in FIG. 2, and the execution process may refer to the description of the step 230.

Figure 8:
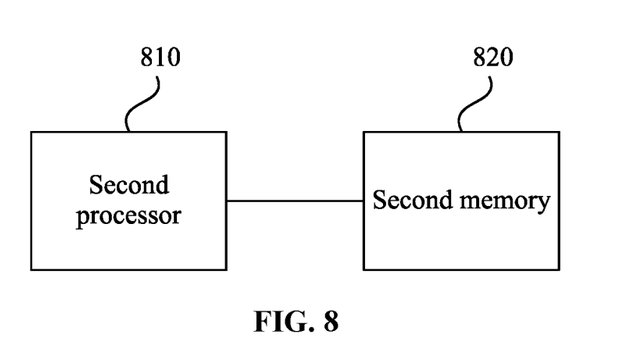
FIG. 8 is a structure diagram of an electronic device according to an embodiment of the present disclosure.

In an embodiment, the present disclosure further provides an equipment. With reference to FIG. 8, the equipment includes a second processor 810 and a second memory 820, where the second memory 820 is configured to store a computer program, and when executed by the second processor 810, the computer program implements the method of any embodiment described above.

In an embodiment, the present disclosure further provides a storage medium storing a computer-readable program. The computer-readable program is configured to, when executed, implement the method of any embodiment described above.

The storage medium is any one or more of various types of memory devices or storage devices. The term "storage medium" is intended to include: an installation medium, a read-only memory (ROM) such as a compact disc read-only memory (CD-ROM), a floppy disk or a magnetic tape device; a computer system memory or a random access memory such as a dynamic random access memory (DRAM), a double data rate random access memory (DDR RAM), a static random-access memory (SRAM), an extended data output random access memory (EDO RAM) or a Rambus random access memory (Rambus RAM); a non-volatile memory such as a flash memory or a magnetic media (e.g., a hard disk or an optical storage); and a register or other similar types of memory components. The storage medium may further include other types of memories or combinations thereof.

The method extracts extractable face feature areas in the target face image through the feature area detection model, extracts extractable target feature point coordinates located within the face feature areas in the target face image through the feature point detection model, and then acquire coordinate information of one or more face feature points in the face image to be detected based on the obtained target feature point coordinates, thereby achieving accurate positioning of face feature points on the face image having the normal face posture or the face image having the abnormal face posture, and ensuring the detection effect of the face feature points.

In summary, in the face feature point detection method and device, the equipment and the storage medium provided by the embodiments of the present disclosure, the face feature point detection method can not only accurately position feature points of the face having the normal posture, but also accurately position the feature points of the face having the abnormal posture, thus ensuring the detection effect of the face feature points. The method is applied to an image processing device. The image processing device stores the feature area detection model for detecting the face feature area and the feature point detection model for detecting the face feature point. First, the method preprocesses the face image to be detected to obtain the preprocessed target face image. Then the method performs feature point extraction on the target face image according to the feature area detection model and the feature point detection model to obtain the target feature point coordinates located within the face feature areas in the target face image. Finally, the method performs the coordinate transformation on the target feature point coordinates to obtain the face feature point coordinates corresponding to the face image to be detected. The method extracts extractable face feature areas in the target face image having the normal face posture or in the target face image having the abnormal face posture through the feature area detection model, extracts extractable target feature point coordinates located within the face feature areas in the target face image through the feature point detection model, and then acquire coordinate information of one or more face feature points in the face image to be detected based on the obtained target feature point coordinates, thereby achieving accurate positioning of face feature points on the face image having the normal face posture or the face image having the abnormal face posture, ensuring the detection effect of the face feature points.

What is claimed is:

1. A face feature point detection method, applied to an image processing device, the method comprising:
preprocessing a face image to be detected to obtain a preprocessed target face image;
performing feature point extraction on the target face image according to a feature area detection model and a feature point detection model to obtain a target feature point coordinate located within a face feature area in the target face image; and
performing coordinate transformation on the target feature point coordinate to obtain a face feature point coordinate corresponding to the face image to be detected,
wherein the feature area detection model for detecting a face feature area and the feature point detection model for detecting a face feature point are stored in the image processing device; and
wherein the performing feature point extraction on the target face image according to the feature area detection model and the feature point detection model to obtain the target feature point coordinate located within the face feature area in the target face image comprises:
extracting all feature point coordinates from the target face image based on the feature point detection model; and
extracting feature area coordinates of all face feature areas from the target face image based on the feature area detection model.

2. The method of claim 1, wherein the performing feature point extraction on the target face image according to the feature area detection model and the feature point detection model to obtain the target feature point coordinate located within the face feature area in the target face image further comprises:
screening out, according to the obtained feature area coordinates, a target feature point coordinate located in each of the face feature areas corresponding to the feature area coordinates from all the feature point coordinates.

3. The method of claim 2, wherein the screening out, according to the obtained feature area coordinates, the target feature point coordinate located in each of the face feature areas corresponding to the feature area coordinates from all feature point coordinates comprises:
comparing each of the feature point coordinates with a feature area coordinate corresponding to each of the face feature areas; and
in response to a comparison result of one or more feature point coordinates located in the each of the face feature areas, using the one or more feature point coordinates as one or more target feature point coordinates in the target face image.

4. The method of claim 1, wherein the image processing device comprises at least one feature point detection model, and each of the at least one the feature point detection model corresponds to one face feature area extracted by the feature area detection model.

5. The method of claim 4, wherein the performing feature point extraction on the target face image according to the feature area detection model and the feature point detection model to obtain a target feature point coordinate located within the face feature area in the target face image comprises:
extracting, from the target face image, target images corresponding to all face feature areas in the target face image according to the feature area detection model;
selecting a respective one of the at least one feature point detection model matched with each of the face feature areas according to a corresponding relationship between the face feature areas and the at least one feature point detection model, and performing feature point extraction on a target image corresponding to the each of the face feature areas, so as to obtain an image feature point coordinate in each of the target images; and
according to a mapping relationship between the target face image and at least one of the target images, performing coordinate transformation on the image feature point coordinate to obtain a target feature point coordinate in the target face image.

6. The method of claim 1, wherein the performing the coordinate transformation on the target feature point coordinate to obtain the face feature point coordinate corresponding to the face image to be detected comprises:
according to a mapping relationship between the face image to be detected and the target face image, performing coordinate transformation on each target feature point coordinate in the target face image to obtain the corresponding face feature point coordinate.

7. A face feature point detection device, applied to an image processing device, the face feature point detection device comprising: a memory, a processor and a computer program stored in the memory and executable by the processor, wherein the processor, when executing the computer program, implements:
preprocessing a face image to be detected to obtain a preprocessed target face image;
performing feature point extraction on the target face image according to a feature area detection model and a feature point detection model to obtain a target feature point coordinate located within a face feature area in the target face image; and
performing coordinate transformation on the target feature point coordinate to obtain a face feature point coordinate corresponding to the face image to be detected,
wherein the feature area detection model for detecting a face feature area and the feature point detection model for detecting a face feature point are stored in the image processing device; and
wherein the performing feature point extraction on the target face image according to the feature area detection model and the feature point detection model to obtain the target feature point coordinate located within the face feature area in the target face image comprises:
extracting all feature point coordinates from the target face image based on the feature point detection model; and
extracting feature area coordinates of all face feature areas from the target face image based on the feature area detection model.

8. The device of claim 7, wherein
the performing feature point extraction on the target face image according to the feature area detection model and the feature point detection model to obtain the target feature point coordinate located within the face feature area in the target face image further comprises:
screening out, according to the obtained feature area coordinates, a target feature point coordinate located in each of the face feature areas corresponding to the feature area coordinates from all the feature point coordinates.

9. The device of claim 8, wherein
the screening out, according to the obtained feature area coordinates, the target feature point coordinate located in each of the face feature areas corresponding to the feature area coordinates from all feature point coordinates comprises:
comparing each of the feature point coordinates with a feature area coordinate corresponding to each of the face feature areas; and
in response to a comparison result of one or more feature point coordinates located in the each of the face feature areas, using the one or more feature point coordinates as one or more target feature point coordinates in the target face image.

10. The device of claim 7, wherein
the image processing device comprises at least one feature point detection model, and each of the at least one the feature point detection model corresponds to one face feature area extracted by the feature area detection model.

11. The device of claim 10, wherein
the performing feature point extraction on the target face image according to the feature area detection model and the feature point detection model to obtain a target feature point coordinate located within the face feature area in the target face image comprises:
extracting, from the target face image, target images corresponding to all face feature areas in the target face image according to the feature area detection model;
selecting a respective one of the at least one feature point detection model matched with each of the face feature areas according to a corresponding relationship between the face feature areas and the at least one feature point detection model, and performing feature point extraction on a target image corresponding to the each of the face feature areas, so as to obtain an image feature point coordinate in each of the target images; and
according to a mapping relationship between the target face image and at least one of the target images, performing coordinate transformation on the image feature point coordinate to obtain a target feature point coordinate in the target face image.

12. The device of claim 7, wherein
the performing the coordinate transformation on the target feature point coordinate to obtain the face feature point coordinate corresponding to the face image to be detected comprises:
according to a mapping relationship between the face image to be detected and the target face image, performing coordinate transformation on each target feature point coordinate in the target face image to obtain the corresponding face feature point coordinate.

13. A non-transitory computer-readable storage medium storing a computer-readable program, wherein the computer-readable program is configured to, when executed, implement the method of claim 1.

14. The method of claim 2, wherein the performing the coordinate transformation on the target feature point coordinate to obtain the face feature point coordinate corresponding to the face image to be detected comprises:
   according to a mapping relationship between the face image to be detected and the target face image, performing coordinate transformation on each target feature point coordinate in the target face image to obtain the corresponding face feature point coordinate.

15. The method of claim 3, wherein the performing the coordinate transformation on the target feature point coordinate to obtain the face feature point coordinate corresponding to the face image to be detected comprises:
   according to a mapping relationship between the face image to be detected and the target face image, performing coordinate transformation on each target feature point coordinate in the target face image to obtain the corresponding face feature point coordinate.

16. The method of claim 4, wherein the performing the coordinate transformation on the target feature point coordinate to obtain the face feature point coordinate corresponding to the face image to be detected comprises:
   according to a mapping relationship between the face image to be detected and the target face image, performing coordinate transformation on each target feature point coordinate in the target face image to obtain the corresponding face feature point coordinate.

17. The method of claim 5, wherein the performing the coordinate transformation on the target feature point coordinate to obtain the face feature point coordinate corresponding to the face image to be detected comprises:
   according to a mapping relationship between the face image to be detected and the target face image, performing coordinate transformation on each target feature point coordinate in the target face image to obtain the corresponding face feature point coordinate.

18. The device of claim 8, wherein the feature point coordinate transformation module is configured to:
   according to a mapping relationship between the face image to be detected and the target face image, perform the coordinate transformation on the target feature point coordinate in the target face image to obtain a corresponding face feature point coordinate.

19. The device of claim 9, wherein the feature point coordinate transformation module is configured to:
   according to a mapping relationship between the face image to be detected and the target face image, perform the coordinate transformation on the target feature point coordinate in the target face image to obtain a corresponding face feature point coordinate.

* * * * *